(12) United States Patent
Warburton et al.

(10) Patent No.: US 11,369,016 B2
(45) Date of Patent: Jun. 21, 2022

(54) METHOD AND SYSTEM FOR PRODUCING A SOUND-RESPONSIVE LIGHTING EFFECT

(71) Applicant: Inventors Workshop Limited, Central (HK)

(72) Inventors: Graham Warburton, Hong Kong (HK); Sze Sun Lo, New Territories (HK)

(73) Assignee: INVENTORS WORKSHOP LIMITED, Central (HK)

( * ) Notice: Subject to any disclaimer, the term of this patent is extended or adjusted under 35 U.S.C. 154(b) by 0 days.

(21) Appl. No.: 17/262,070

(22) PCT Filed: Feb. 6, 2020

(86) PCT No.: PCT/CN2020/074420
§ 371 (c)(1),
(2) Date: Jan. 21, 2021

(87) PCT Pub. No.: WO2020/160708
PCT Pub. Date: Aug. 13, 2020

(65) Prior Publication Data
US 2021/0360762 A1    Nov. 18, 2021

(30) Foreign Application Priority Data

Feb. 8, 2019  (HK) .................. 19119307.7

(51) Int. Cl.
*H05B 45/20*    (2020.01)
*H05B 47/12*    (2020.01)
(Continued)

(52) U.S. Cl.
CPC ............... *H05B 47/12* (2020.01); *G06F 3/16* (2013.01); *H05B 45/20* (2020.01); *G09F 9/33* (2013.01)

(58) Field of Classification Search
CPC ........ H05B 45/20; H05B 47/12; H05B 45/22; H05B 45/10; H05B 45/14; G06F 3/16; G06F 9/33; Y02B 20/40
See application file for complete search history.

(56) References Cited

U.S. PATENT DOCUMENTS 9,449,590 B1 *  9/2016  Severson ................. G10H 5/10
9,799,178 B2 * 10/2017  Mason .................. H05B 47/10
(Continued)

FOREIGN PATENT DOCUMENTS

CN      1097854 A    1/1995
CN    103931275 A    7/2014
(Continued)

*Primary Examiner* — Haissa Philogene
(74) *Attorney, Agent, or Firm* — GableGotwals

(57) ABSTRACT

The system comprises a sound receiving module for receiving an incoming sound signal, a sound processing module for processing the incoming sound signal to generate a set of a plurality of sound channels and a color processing module for associating subsets of the set of sound channels with respective ones of a plurality of color units, and subsequently, converting the plurality of color units into a light signal of one or more colors. The number of the plurality of color units is equal to or less than the number of the subsets of the set of sound channels. The one or more colors of the light signal vary in a response to variations of the incoming sound signal to thereby produce the sound-responsive lightning effect.

17 Claims, 2 Drawing Sheets

(51) Int. Cl.
  *G06F 3/16*   (2006.01)
  *G09F 9/33*   (2006.01)

(56) References Cited

U.S. PATENT DOCUMENTS

2017/0270904 A1* 9/2017 Suitor .................... G10H 3/183
2021/0211823 A1* 7/2021 Shani ..................... H04R 1/406

FOREIGN PATENT DOCUMENTS

JP    S6473385 A    3/1989
KR    20110008494 A    1/2011

* cited by examiner

METHOD AND SYSTEM FOR PRODUCING A SOUND-RESPONSIVE LIGHTING EFFECT

CROSS-REFERENCE TO RELATED APPLICATIONS

This United States application is the National Phase of PCT Application No. PCT/CN2020/074420 filed 6 Feb. 2020, which claims priority to Hong Kong Patent Application No. 19119307.7 filed 8 Feb. 2019, each of which is incorporated herein by reference.

TECHNICAL FIELD

The invention relates to a computer-implemented method and system for producing a lighting effect, and particularly but not exclusively, for producing a lighting effect in response to sound.

BACKGROUND ART

The use of advanced lighting technologies, such as computer-controlled lighting equipment for creating or improving the atmosphere of a space or an environment for the purpose of scene setting or enhancing mood of the occupants is becoming increasingly popular. Various studies have revealed that, by providing the space such as a room or a venue with a suitable lighting effect, such as lighting with different colors and/or brightnesses, the created ambience is found to influence at least some of the occupants at biological and/or psychological levels.

There is also a growing trend in the development of voice commanded or sound activated electronic appliances. Some of these audio input based technologies relate to the use of sound recognition and/or artificial intelligence software for processing and analyzing incoming audio instructions. Audio instructions from the users can be recognized to thereby activate functionalities of the appliances and to carry out the corresponding applications. For example, computer-controlled lighting devices such as smart light bulbs or light controls which wirelessly receive and process voice instructions for turning on and off the lights, and/or adjusting brightness or color of the lights, have been developed.

Yet the available technology for the creation of lighting effect or lighting control based on audio inputs is limited, and there exists a need to improve the known technology for a more dynamic application with enhanced lighting effects.

SUMMARY OF INVENTION

Technical Problem

An object of the present invention is to provide a computer-implemented method and system for producing a sound-responsive lighting effect.

Another object of the present invention is to mitigate or obviate to some degree one or more problems associated with known sound-responsive lighting technology, or at least to provide a useful alternative.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SOLUTION TO PROBLEM

Technical Solution

In a first main aspect, the invention provides a system for producing a sound-responsive lighting effect. The system comprises a sound receiving module for receiving an incoming sound signal; a sound processing module for processing the incoming sound signal to generate a set of a plurality of sound channels; a color processing module for associating subsets of the set of sound channels with respective ones of a plurality of color units, and subsequently, converting the plurality of color units into a light signal of one or more colors, wherein a number of the plurality of color units is equal to or less than a number of the subsets of the set of sound channels; wherein the one or more colors of the light signal vary in response to variations of the incoming sound signal to thereby produce the sound-responsive lighting effect.

In a second main aspect, the invention provides a computer-implemented method for producing a sound-responsive lighting effect. The method comprises the steps of receiving an incoming sound signal; processing the incoming sound signal to generate a set of a plurality of sound channels; associating subsets of the set of sound channels with respective ones of a plurality of color units, and converting the plurality of color units into a light signal of one or more colors, wherein a number of the plurality of color units is equal to or less than a number of the subsets of the set of sound channels; wherein the one or more colors of the light signal vary in response to variations of the incoming sound signal to thereby produce the sound-responsive lighting effect.

The summary of the invention does not necessarily disclose all the features essential for defining the invention; the invention may reside in a sub-combination of the disclosed features.

Advantageous Effects of Invention

BRIEF DESCRIPTION OF DRAWINGS

Description of Drawings

Figure 1:
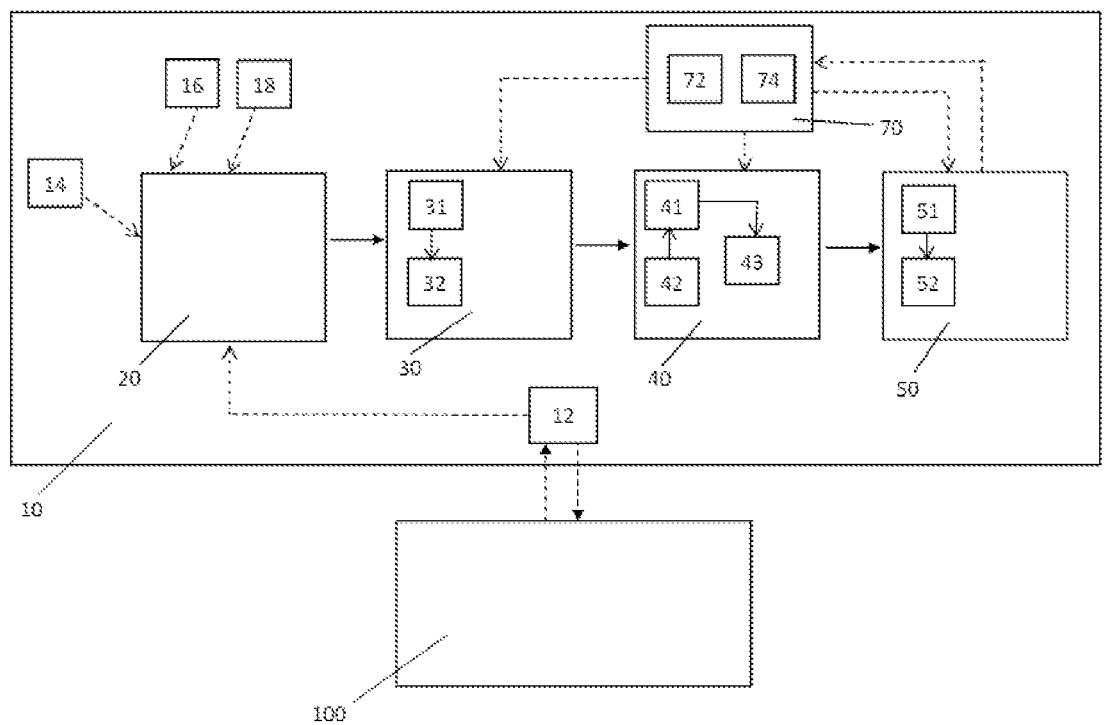
Figure 2:
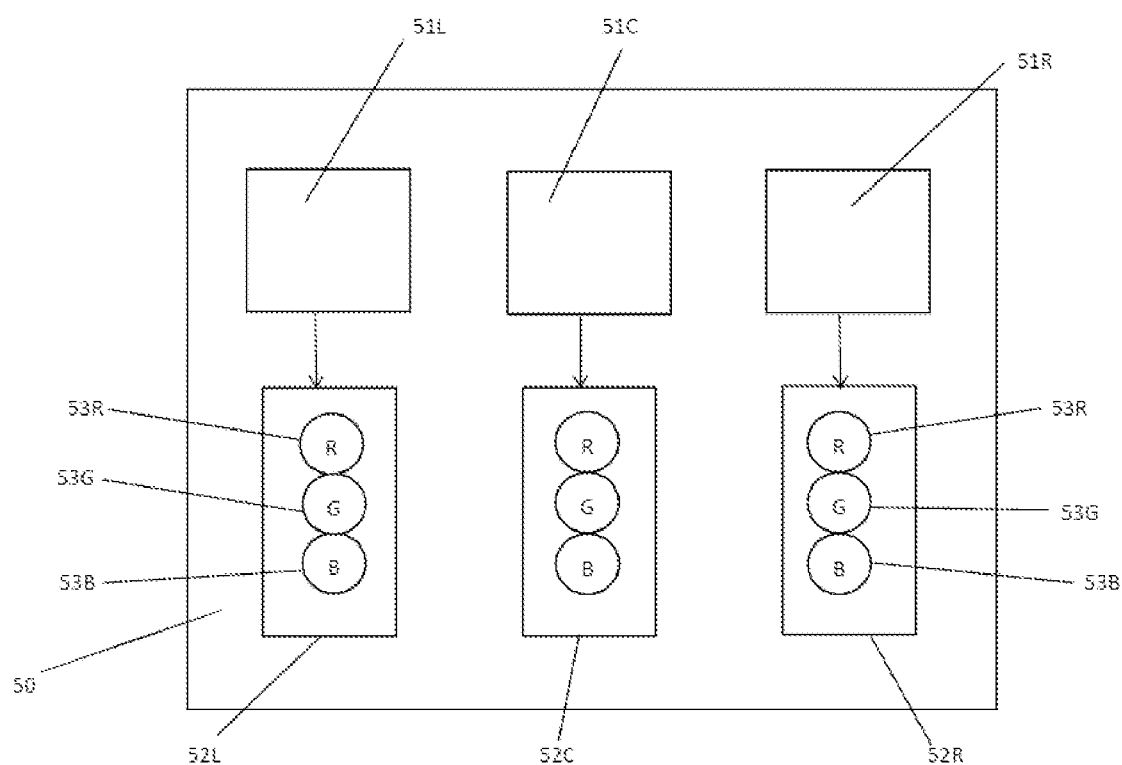

The foregoing and further features of the present invention will be apparent from the following description of preferred embodiments which are provided by way of example only in connection with the accompanying figures, of which:

FIG. 1 is a block schematic diagram showing a computer-implemented system for producing a sound-responsive lighting effect according to the present invention; and FIG. 2 is a block diagram showing the light emitting module of the system of FIG. 1.

BEST MODE FOR CARRYING OUT THE INVENTION

Best Mode

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the figure, may be implemented in various forms of hardware, software or combinations thereof. Preferably, these elements are implemented in a combination of hardware and software on one or more appropriately programmed general-purpose devices, which may include a processor, memory and input/output interfaces.

Referring to FIG. 1, shown is a block schematic diagram of a system for producing a lighting effect, and particularly, for producing a lighting effect in response to an audio input. The audio input can be in the form of sounds or audio signals of any types from any sources, for example, sound generated by a radio or a television, a loud speaker connected with a microphone or an audio playing system, a computer, or any electronic devices adapted to emit sounds including portable devices such as a smart phone. The audio input may also be a speech input directly from a user in the form of a voice command. The sounds or audio signals are not limited to message type instructions, i.e. being composed of words or sentences in any languages, but can be sounds of any forms including, but not limited to, music, songs, random notes of sound or even noises of any types and of any frequencies, intensities, amplitudes and/or patterns. In the context of the present invention, the terms "sounds', "sound signals", "audio signals", "sound input" or "audio input" or the like, are given with broad meanings to cover audio frequencies in both the human audible range, i.e. about 20 Hz to about 20 kHz, and also the human inaudible ranges, i.e. infrasonic and ultrasonic ranges.

Depending on the nature, characteristics and properties of the audio input, the sound signal detectable or receivable by the present invention can be a live, time-varying sound input, such as a speech or a song. In response to the varying sound input, the method and system of the present invention are capable of timely or in real time generating a lighting effect which varies in accordance with the variations of the incoming sound signal. For example, the generated lighting effect may change in real time its color, hue, saturation, brightness, or intensity, etc. based on the pace, tone, loudness, pattern or any other characteristics of the varying incoming sound. The present invention is therefore advantageous in providing a dynamic lighting effect, which conforms with or is in contrast to the mood or attitude of the inputted signal, for example, a selected piece of song or music, or the tone or attitude of the speaker who provides the speech command to thereby create an ambience which enhances or relieves the mood or even a condition of the person speaking. For example, a vibrant color scheme can be generated in response to an uplifting party music to enhance the atmosphere of the venue; and a calming, relaxing color theme can be generated in response to a loud, high-pitch or fast-pace voice command to comfort and/or to soothe an anxious or irritated state of mood of the speaker.

Applications of the present invention are not limiting and, in one embodiment, the present invention can be implemented in an electronic device 10 such as a computer device in any known form including desk top computers, laptop computers, tablet computers, smart phones, or any portable electronic smart devices; as well as any electric appliances for domestic, commercial or industrial uses such as decorative table lightings, illuminated advertising signs, or medical devices for therapeutic applications, etc. Preferably, the device 10 is connectable with a communication network 100 to form a system, with the network 100 being either a private network or a public network such as the internet, via a communication module 12 for exchanging information or data. In one embodiment, the present invention can be implemented in a microprocessor where said microprocessor is in communication with a memory storing machine code configured, when executed, to perform the steps of the methods herein described.

The device 10 may comprise a sound receiving module 20 for receiving an incoming sound or sound signal. A number of different, possible routes for receiving the sound signal are shown in dotted-line in FIG. 1. For example, a user may provide a voice input or command via speaking to a sound collecting or amplifying device 14, such as a microphone, connected to the device 10. The user may also speak directly to a sound receiver 16 at the device 10 configured to receive a sound signal. The user may also open a pre-recorded voice command which has been previously prepared and saved in the memory 18 of the device 10. The user may further input in real time or download a sound signal, such as an audio clip, a song or a piece of music of interest from the internet 100 via the communication module 12, for example.

The received sound signal will subsequently be processed and analyzed by a sound processing module 30 of the device 10, as shown in FIG. 1. Specifically, the received sound signal will be processed via one or more circuitries and/or algorithms to generate a set of a plurality of sound channels, with each of the plurality of sound channels having a predetermined frequency or frequency band. For example, each of the sound channels may comprise one or more of a selected or calculated specific frequency component of the incoming sound signal, or a selected or calculated band of frequencies of the incoming sound signal. For the selected or calculated specific frequency component of the incoming sound signal, the set of sound channels may comprise one of linearly defined frequency components of the incoming sound signal, logarithmically defined frequency components of the incoming sound signal, weighted defined frequency components of the incoming sound signal, or frequency components of the incoming sound signal defined according to a selected or calculated distribution function. Similarly, for the selected or calculated band of frequencies of the incoming sound signal, the set of sound channels may comprise one of linearly defined bands of frequencies of the incoming sound signal, logarithmically defined bands of frequencies of the incoming sound signal, weighted defined bands of frequencies of the incoming sound signal, or bands of frequencies of the incoming sound signal defined according to a selected or calculated distribution function.

In one embodiment, the set of plurality of sound channels can be formed by segmenting the incoming sound signal. The segmenting of the sound signal can be conducted by, for example, an audio analyser 32 of the sound processing module 30. In one specific embodiment, the set of plurality of sound channels can be generated by a Fast Fourier Transform (FFT) or similar algorithm executed by the audio analyser 32 of the sound processing module 30. The segmented sound channels can be of equal frequency bands or different frequency bands, depending on the segmenting criteria and thus the nature of the set of sound channels required in view of the respective application of the lighting effect to be generated. In one preferred embodiment, a set of about 512 sound channels can be processed by the audio analyser 32 of the sound processing module 30, for example.

Preferably, quality of the incoming sound signal, for example, amplitude of the received sound signal can be adjusted, filtered or enhanced prior to the segmenting step in forming the plurality of sound channels. The adjustment can be conducted by any known signal adjusting or refining components such as, but is not limited to, an automatic gain control 31 for adjusting saturation level of the incoming signals, for example. The adjustment may further be facilitated by any one or more conventional filters and/or tone detectors (not shown) for further processing the audio signals.

A subset of the processed set of sound channels will then be associated, via a color processing module 40, with a respective one of a plurality of color units. Each of the color units may comprise one or more of a selected or calculated specific light frequency component; or a selected or calculated band of light frequencies. Preferably, the associating step can be conducted via a color assignment unit 41 by mapping the subsets of the sound channels with respective ones of predetermined colors from a base color array 42 to form the plurality of color units. For example, in one embodiment, the associated color units may comprise 11 or more groups of base color units of light frequencies or bands of light frequencies. The number of color units is preferred to be less than or equal to the number of the subsets of the set of sound channels. The base color array 42 can be provided prior to the associating step for the formation of the assigned color units. Preferably, the base color array 42 may comprise a spectrum of colors ranged from about 400 nm to about 700 nm. Alternatively, the base color array 42 may comprise any intervals of said frequencies or any arbitrary sequences of light frequencies and thus colors. The base color array 42 may also be varied or adjusted manually according to the user's preference, and/or be controlled or modified automatically under the action of one or more feedback mechanisms 70 of the device 10, which will be discussed later in detail.

The assigned color units will then be combined at, for example, a color combiner 43 of the color processing module 40, to form one or more combined color signals. The combined color signals may correspond to and will subsequently be converted to a light signal for one or more corresponding colors, for example, red, blue and green, etc. In one embodiment, the sound channels from the sound processing module 30 may on occasions provide saturation in colors of the associated color units which affect colour discernment. Preferably, one or more mathematical algorithms such as a non-linear adjustment function can be adopted to ameliorate this potential distortion. An example of one such function is a segmented gain control algorithm applied by the color processing module 40 for adjusting signal sensitivity of the color units prior to the colour combination step. Nevertheless, a skilled person in the relevant art would appreciate that said adjustment shall not be limited to any specific algorithm conducted at any specific means and/or in any specific manner, but any possible alternatives which are considered reasonable and/or applicable to achieve the same effect, shall also be encompassed.

The light signal carrying the corresponding color information will be processed via a light emitting module 50 to thereby emit light in the corresponding colors for generating the sound-responsive lighting effect. The transmission of the light signal from the color processing module 40 to the light emitting module 50 can be via one or more electric connections (wired connections) and/or one or more wireless connections such as, but not limited to, Wi-Fi, Bluetooth, Radio Frequency (RF), etc. In one embodiment, the light emitting module 50 may comprise one or more respective drivers 51 for communicating the light signal with one or more light-emitting means 52, such as a light emitting diode display (LEDD) 52 having a set or a plurality sets of light emitting diodes (LED) 53, as shown in FIG. 2. Via the sets of LEDD 52, one or more corresponding colors of light based on the light signals can be emitted in a predetermined duration or brightness. The light may further be produced at different hues, contrasts and/or intensities, etc. depending on the light signal generated based on combined color units which in turn is according to the incoming sound signal and the sequential processing, associating and converting steps previously involved. In one specific embodiment, the light emitting module 50 is preferred to comprise three sets of drivers 51L, 51C and 51R, as shown in FIG. 2, for driving three corresponding sets of LEDDs 52L, 52C and 52R for light emission in three different positions such as, for example, left (L), central (C) and right (R), with the display at the left and right 52L, 52R corresponding to the left and right stereo sound input, and the central LEDD 52C representing a mixture of the left and right signals. In one specific embodiment, the three sets of LEDDs 52L, 52C and 52R may each comprise three individual LEDs for emitting light comprising combinations of the primary colors of red (R), green (G) and blue (B). Nevertheless, it will be appreciated that variations to the arrangement and configuration of the light emitting module 50 in, for example, the number and form of the drivers 51, the number and form of the LEDDs 52 and the number and form of the individual LEDs 53 of each of the LEDDs 52, and the colors of light and the number of colors of light emittable by the LEDDs 52 or the individual LEDs 53, positions of the LEDs 53 and the LEDDs 52, etc. are readily encompassed by the present invention.

The device 10 may further comprise a feedback mechanism 70 to adjust, control or modify operation of one or more of the sound processing module 30, color processing module 40 and light emitting module 50. Preferably, the feedback mechanism 70 may comprise a detecting module 72 adapted to detect the produced lighting effect by the light emitting module 50, and to provide a feedback signal to adjust operation of one or more of the sound processing module 30 and the color processing module 40, as shown by the dotted line of FIG. 1. For example, the feedback signal may take effect in relation to one or more of the automatic gain control 31 for adjusting the incoming sound signals, and the audio analyser 32 for modifying the signal processing or segmenting step in forming the respective set of sound channels. The feedback signal may also be adapted to vary the base color array 42 for base color selection, adjust or modify the color mapping step at the color assignment unit 41 and/or the color combining step at the color combiner 43, for example. In one embodiment, the device 10 may further comprise a control module 74 for manually controlling the sound processing module 30, the color processing module 40 and/or the light emitting module 50. The output lighting effect would therefore be controllable or adjustable via the automatic feedback control and/or via manual adjustment by the user, depending on the specific application required.

In summary, in response to the time varying sound input received at the sound receiving module 20, the sound processing module 30 is adapted to process the received sound signal to generate a corresponding set of sound channels. The set of sound channels, which may comprise segmented audio frequencies or bands of frequencies, would then be matched and assigned with one or more corresponding color units or groups of color units based on a provided base color array. The color units will subsequently be combined to form a light signal representing light of one or more colors to be emitted by the light emitting module 50. The method and the system of the present invention thus allows a substantially real time "conversion" of a time varying sound signal to a light signal of various colors, with the colors of the light being substantially instantaneously variable in response to the varying sound signal received. The present invention is thus capable of creating a dynamic lighting effect, with its characteristics such as, for example, brightness, colors, intensities of colors, or patterns of the light and/colors, etc. being variable in response to variations of the sound input. The light effect can further be customised, either automatically or manually, for different purposes and applications. For example, the displayed color schemes or patterns can be arranged to conform with or in contrast to the mood of the inputted sound signal, thereby providing an appropriate ambience via the generated lighting effect to address, enhance or relieve a mood, a condition or to provide a therapeutic effect, for example. The present invention also provides a user with a visual perception of changing colors, with the color change being responsive to and matched with an accompanying sound variance such that both the visual perception and the audio reception can be instantaneously received by the user for a potential relieving or therapeutic effect.

The present invention also relates a computer readable medium storing machine readable instructions which, when implemented on a processor, implements the steps of the method as described above. The present invention further relates a system comprising a memory for storing data and a processor for executing a computer readable medium, wherein the processor is configured by computer readable instructions when being executed to implement the method as described above.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A system for producing a sound-responsive lighting effect, the system comprising:
   a sound receiving module for receiving an incoming sound signal;
   a sound processing module for processing the incoming sound signal to generate a set of a plurality of sound channels;
   a color processing module for associating subsets of the set of sound channels with respective ones of a plurality of color units, and subsequently, converting the plurality of color units into a light signal of one or more colors, wherein a number of the plurality of color units is equal to or less than a number of the subsets of the set of sound channels;
   wherein the one or more colors of the light signal vary in response to variations of the incoming sound signal to thereby produce the sound-responsive lighting effect.

2. The system according to claim 1, wherein the system is adapted to receive and process sound signals with frequencies in both human audible and inaudible ranges.

3. The system according to claim 1, wherein the sound processing module comprises an audio analyser adapted to segment the incoming sound signal into the plurality of sound channels each having a predetermined frequency or frequency band.

4. The system according to claim 3, wherein the incoming sound signal is segmented to comprise sound channels of equal frequency bands or of different frequency bands.

5. The system according to claim 3, wherein the incoming sound signal is segmented by a Fast Fourier Transform (FFT) or similar algorithm.

6. The system according to claim 1, wherein each sound channel of the plurality of sound channels comprises any one or more of: a selected or calculated specific frequency component of the incoming sound signal; or a selected or calculated band of frequencies of the incoming sound signal.

7. The system according to claim 1, wherein each sound channel of the plurality of sound channels comprises a selected or calculated specific frequency component of the incoming sound signal, the set of sound channels may comprise any one of: linearly defined frequency components of the incoming sound signal; logarithmically defined frequency components of the incoming sound signal; weighted defined frequency components of the incoming sound signal; or frequency components of the incoming sound signal defined according to a selected or calculated distribution function.

8. The system according to claim 1, wherein each sound channel of the plurality of sound channels comprises a selected or calculated band of frequencies of the incoming sound signal, the set of sound channels may comprise any one of: linearly defined bands of frequencies of the incoming sound signal; logarithmically defined bands of frequencies of the incoming sound signal; weighted defined bands of frequencies of the incoming sound signal; or bands of frequencies of the incoming sound signal defined according to a selected or calculated distribution function.

9. The system according to claim 1, wherein each color unit of the plurality of color units comprises any one or more of: a selected or calculated specific light frequency component; or a selected or calculated band of light frequencies.

10. The system according to claim 1, wherein the plurality of color units is determined from a base color array comprising a spectrum of colors ranged from about 400 nm to about 700 nm.

11. The system according to claim 1, wherein the plurality of color units comprises 11 or more color units.

12. The system according to claim 1, wherein the plurality of color units is combined to form one or more combined color signals representing one or more colors of the light signal.

13. The system according to claim 12, further comprising one or more light emitting means adapted to emit light of one or more colors based on the light signal of one or more colors.

14. The system according to claim 13, wherein the one or more light emitting means are adapted to emit light in one or more of color red, green and blue.

15. The system according to claim 1, further comprising a detecting module adapted to detect the produced lighting effect and to provide a feedback signal to adjust operation of one or more of the sound processing module and the color processing module.

16. The system according to claim 1, further comprising a control module adapted to manually adjust operation of one or more of the sound processing module, the color processing module and the light emitting module.

17. A computer implemented method of producing a sound-responsive lighting effect, comprising:
  receiving an incoming sound signal;
  processing the incoming sound signal to generate a set of a plurality of sound channels;
  associating one or more subsets of the set of sound channels with respective ones of a plurality of color units, and converting the plurality of color units into a light signal of one or more colors, wherein a number of the plurality of color units is equal to or less than a number of the subsets of the set of sound channels;
  wherein the one or more colors of the light signal vary in response to variations of the incoming sound signal to thereby produce the sound-responsive lighting effect.

* * * * *